United States Patent [19]

Pascau

[11] 4,339,362

[45] Jul. 13, 1982

[54] HARDENING COMPOSITION CONTAINING CELLULOSE POWDER, LATEX, MAGNESITE AND MAGNESIUM CHLORIDE

[75] Inventor: Jean-Maurice Pascau, Bordeaux, France

[73] Assignee: Newco Synthetics International Inc., Toronto, Canada

[21] Appl. No.: 53,196

[22] Filed: Jun. 29, 1979

[30] Foreign Application Priority Data

Jul. 4, 1978 [FR] France ................................. 78 19913

[51] Int. Cl.³ .................... C04B 9/14; C04B 31/36; C08L 1/00
[52] U.S. Cl. .................................... 524/5; 106/108; 428/159; 428/160; 428/251; 428/319.7; 428/319.9; 524/8
[58] Field of Search .................. 260/17.4 CL; 106/108

[56] References Cited

U.S. PATENT DOCUMENTS

| 1,568,507 | 1/1926 | Jaeger et al. | 106/108 |
| 1,586,046 | 5/1926 | Romerill | 106/108 |
| 2,025,369 | 12/1935 | Batelja | 106/108 |
| 2,939,799 | 6/1960 | Chisholm | 106/108 |
| 3,719,512 | 3/1973 | Danielis | 106/108 |
| 3,788,870 | 1/1974 | Zur Verth et al. | 106/108 |
| 4,111,868 | 9/1978 | Ficken | 260/42.13 |

FOREIGN PATENT DOCUMENTS

| 528092 | 7/1956 | Canada | 260/17.4 |
| 1127975 | 12/1956 | France. | |
| 2075790 | 10/1971 | France. | |
| 48-20425 | 6/1973 | Japan | 260/17.4 |

OTHER PUBLICATIONS

Chem. Absts., vol. 85:82586m, Spackling, Shmakova et al.

Primary Examiner—John Kight, III
Assistant Examiner—Nathan M. Nutter
Attorney, Agent, or Firm—Ridout & Maybee

[57] ABSTRACT

A hardenable composition is disclosed containing magnesite, a filler material containing cellulose powder, magnesium chloride, latex and water; and an article obtained from this composition.

The invention is particularly suited for insulating panels for the construction industry, for repairing and resurfacing exterior concrete and for other exterior construction including the manufacture of molded pipes.

11 Claims, 2 Drawing Figures

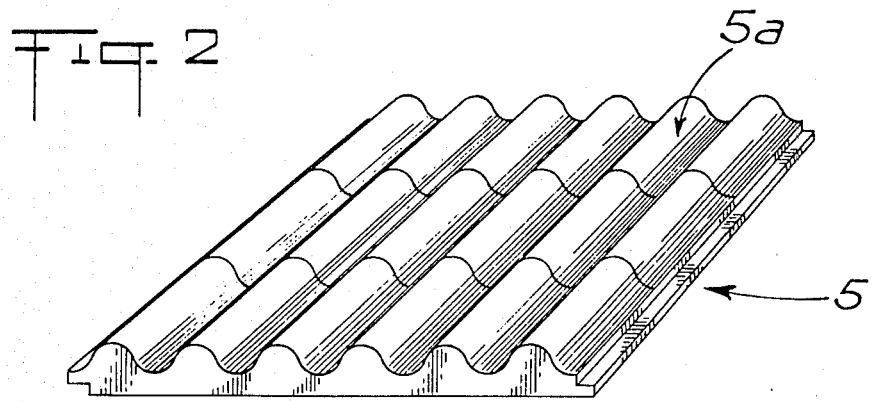
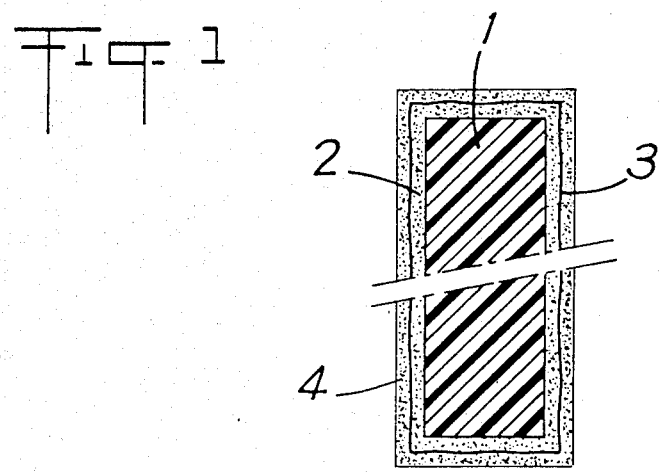

HARDENING COMPOSITION CONTAINING CELLULOSE POWDER, LATEX, MAGNESITE AND MAGNESIUM CHLORIDE

The present invention relates to a hardenable composition, containing powdered magnesite, a filler material, magnesium chloride and water.

From French Pat. No. 1,028,572 and U.S. Pat. No. 2,463,663, compositions of this type are already known in which the filler material contains talc and a finely divided natural organic substance, such as powdered leather, granules of cork, sawdust or wood flour.

Most filler materials have the disadvantage of not spreading in a homogeneous manner through the body of the paste obtained after mixing the constituents of the composition. Because of this, the hardened substance obtained after the paste dries does not have homogeneous properties throughout its mass.

The invention seeks to overcome this disadvantage, and attempts to provide a hardenable composition which is easy to utilise, and which yields a substance sufficiently strong to permit the fabrication of items having considerable mechanical strength, formed by the deposition of one or more layers of this material on a support of expanded plastic.

In accordance with the invention this object is achieved by the addition of cellulose powder and latex to a magnesium oxychloride cement. The cellulose powder is added as at least part of the filler.

Cellulose powder, contrary to wood flour, mixes intimately with all the other constituents of this composition to result in a fine and unctuous paste.

Preferably, the filler material also contains finely powdered silica, having an average particle diameter less than 50 μm, in an amount by weight between 30% and 200% of the weight of powdered cellulose. Due to the presence of silica, there is obtained a hard and fireproof material, despite the presence of cellulose powder.

Preferably, the average particle diameter of the cellulose is less than 200 μm. This fineness of cellulose particles allows greater molding accuracy of the composition.

Preferably, the latex is either of the acrylic type or of the natural or synthetic rubber type.

Preferably, the latex content, taken at the weight of its dry extract, lies between 1% and 15% of the weight of the cellulose powder in the dry state.

The material obtained is less breakable while still retaining its hardness, and it is rendered relatively non-porous so as to be relatively completely impermeable to moisture. This allows the material to find use as roofs, boat hulls and other items which must be quite impermeable to water or to other liquids.

Preferably, the content of powdered cellulose by weight lies between 30% and 150% of the weight of magnesite.

Preferably, the filler material also contains talc, and in an amount by weight which lies between 30% and 70% of the weight of powdered cellulose.

The invention also relates to the hardened substance obtained from the hardenable composition defined above.

A solid composite item including a support portion of expanded plastic, for example of expanded polystyrene or polyurethane, can be made by covering at least one layer of hardened material as defined above.

The cellulose powder facilitates the adhesion of the said material to the expanded plastic constituting the support.

Due to the presence of finely powdered silica in sufficient quantity, preferably a quantity by weight which is substantially equal to that of the cellulose powder and of the magnesite, the layer of hardened material constitutes in effect a hard and unbreakable shell. This renders the composite object particularly suitable for the construction of insulating and/or load-bearing panels, of girders, of molded panels in the form of a tiled roof for the construction industry, of kilometer markers, etc. For artificial stones, a calcareous stone powder, such as limestone, can be added to the fillers.

Other characteristics and advantages of the invention will be better understood from the following description of several embodiments, with reference to the attached drawings in which:

FIG. 1 is a cross-section through a panel in accordance with an embodiment of the invention; and FIG. 2 is a perspective view of a panel in the form of a tiled roof, in accordance with an embodiment of the invention.

EXAMPLE I

For the fabrication of acoustically and thermally insulative fireproof panels, in the construction of buildings, or of blades for airplanes, or of kilometer markers, the following formula is utilised:

LIQUID FOR 100 LITERS:

60 l. of water 30 kg of magnesium chloride 10 l. of synthetic rubber in an aqueous suspension in the ratio of 200 grams per liter.

POWDER FOR 100 kg.

30 kg of magnesite 30 kg of silica as a fine powder (average diameter of grains less than 50 μm).

15 kg of talc 25 kg cellulose powder (average diameter of grains less than 200 μm).

A paste is made by mixing this liquid with this powder at the ratio of one kg of powder per liter of liquid.

On a flat, parallelepipedic support of expanded polystyrene or of polyurethane foam, a layer 2 of this paste is laid against the 6 exterior faces of the support 1; a cloth of glass fibers 3 (three fibers to the cm$^2$) is applied to these 6 faces. Then, a second layer 4 is laid upon these 6 faces, and the composite item is left to dry (FIG. 1).

EXAMPLE II

To make a tiled panel which is load-bearing, thermally and acoustically insulative and fireproof, the same formula is used as was given in Example I.

There is employed a support 5 of polystyrene or of polyurethane foam as depicted in FIG. 2. A layer of the paste described in Example I is laid over all of the faces of the support 5. Thereafter a cloth of glass fibers (three fibers to the cm$^2$) is applied against these faces. Then a second layer is laid upon the said faces of the support, with the exception of the undulating face (5a).

On the undulating face 5a there is applied a pattern which perfectly imitates brick or tile, along with a hardenable paste which is colored throughout by means of any coloring material having the color of tiles.

This paste is obtained by mixing together the liquid and powder specified in Example I at the ratio of 2 kg of powder per liter of liquid.

EXAMPLE III

To make artificial stones, the following formula is used:

LIQUID FOR 100 LITERS 60 l. of water
30 kg of magnesium chloride
10 l. of synthetic rubber in an aqueous suspension in the ratio of 200 grams per liter.

POWDER FOR 100 kg 30 kg of baked magnesite
30 kg of natural calcareous stone powder
10 kg of talc
15 kg of cellulose powder
15 kg of silica.

The liquid and the powder are mixed together in the ratio of 2 kg of powder per liter of liquid, to obtain a paste.

To this paste are added oxides of iron or any coloring material in order to obtain the desired stone color.

The paste is spread on a surface or poured into a mold, and then allowed to dry.

EXAMPLE IV

To make or repair a step in a flight of stairs, the following formula is used:

LIQUID FOR 100 LITERS 60 l. of water
30 kg of magnesium chloride
10 l. of synthetic rubber in an aqueous suspension in the ratio of 200 grams per liter.

POWDER FOR 100 kg 30 kg of baked magnesite
30 kg of finely powdered silica
15 kg of talc
25 kg of cellulose powder The liquid and powder are mixed together in the ratio of 3 kg of powder per liter of liquid to obtain a fairly consistent paste.

This paste is spread out with a thickness of 1 cm or more, and is left to dry.

EXAMPLE V

To make a boat hull, the following formula is used:

LIQUID FOR 100 LITERS 50 l. of water
35 kg of magnesium chloride
15 l. of synthetic rubber in an aqueous suspension in the ratio of 200 grams per liter.

POWDER FOR 100 kg 30 kg of baked magnesite
15 kg of talc
15 kg of finely powdered silica
40 kg of cellulose powder The liquid and the powder are mixed together in the ratio of one kilogram of powder per liter of liquid to obtain a paste.

A first layer of this paste is spread on a mold. Upon this layer is applied a fine cloth of glass fibers (three fibers per cm$^2$).

A second layer of paste is spread on this cloth and on this second layer is applied a thicker cloth of glass fibers (mesh of 1 cm$^2$).

A third layer of paste is spread upon this thick cloth and then a second fine cloth of glass fibers is applied (three fibers per cm$^2$).

This latter cloth is covered with a fourth layer of paste, following which the whole is left to dry and then removed from the mold.

Due to the high cellulose powder content in the formula used in the present example, a material is obtained which can be easily sawed and which will hold screws.

The hardened material provided by the present patent application is relatively rot-proof, fireproof, strong, and acoustically and thermally insulative. It can be mixed with various waste materials, such as scrap iron, dead leaves, sawdust, wood fibers, polystyrene and vermiculite.

This material may be utilised for light construction, panels either prefabricated or otherwise, floors, piping, coverings, artificial tiles, artificial beams, artificial woodwork, toys, articles and items used in advertising, stair steps, stones, insulative floors, palettes for load carrying, etc.

What I claim is:

1. A hardenable composition containing magnesite, finely moldable cellulose powder, magnesium chloride, water and at least 0.5% by dry extract weight latex of the acrylic type or of the natural or synthetic rubber type.

2. A composition as in claim 1, in which the average diameter of the particles of cellulose powder is less than 200 $\mu$m.

3. A composition according to claim 2 which contains at least 5% by weight cellulose powder in the dry state and in which the latex content, taken as the weight of dry extract, lies between 1% and 15% of the weight of cellulose powder in the dry state.

4. The composition of claim 3 in which the magnesite and magnesium chloride are present in a ratio by weight of approximately 1:1.

5. A composition as in claims 1 or 4, in which the filler material also contains finely powdered silica, having grains of an average diameter less than 50 $\mu$m.

6. The composition of claim 5 in which the silica comprises by weight between 30% and 200% of the weight of cellulose powder.

7. A composition according to claims 1 or 4, in which the filler material also contains talc.

8. The composition of claim 3 in which the talc comprises between 30% and 70% of the weight of cellulose powder.

9. A hardenable composition containing approximately the following by weight:
 (a) 25 to 30% water
 (b) 15% magnesium chloride
 (c) 15% baked magnesite
 (d) 5–7.5% acqueous suspension of latex of the acrylic type or of the natural or synthetic rubber type of 200 grams per liter
 (e) 7.5–20% finely moldable cellulose powder
 (f) 12.5%–30% additional filler.

10. A hardenable composition according to claim 9 in which the filler additionally contains talc in an amount of 5–7.5% by weight.

11. A hardenable composition according to claim 10 in which the filler additionally contains silica in an amount of approximately 7.5–15% by weight.

* * * * *